(12) United States Patent
Suzuki

(10) Patent No.: US 6,430,669 B1
(45) Date of Patent: *Aug. 6, 2002

(54) MEMORY WITH ADDRESS CONVERSION TABLE

(75) Inventor: Kazumasa Suzuki, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,980

(22) Filed: Nov. 4, 1999

(30) Foreign Application Priority Data

Nov. 6, 1998 (JP) .................................. 10-315762

(51) Int. Cl.[7] ............................................... G06F 12/10
(52) U.S. Cl. ...................................................... 711/206
(58) Field of Search ................................ 711/206, 207, 711/202, 205, 165

(56) References Cited

U.S. PATENT DOCUMENTS 4,373,179 A * 2/1983 Katsumata .................. 711/207
4,933,938 A * 6/1990 Sheehy ........................ 370/401
6,192,455 B1 * 2/2001 Bogin et al. ................. 711/154

OTHER PUBLICATIONS

Kai Hwang, "Advanced Computer Architecture", 1993, McGraw–Hill Inc, pp. 199–204.*
John L. Hennessy & David A. Patterson, "Computer Architecture a Quantitative Approach", Second Edition 1996, Morgan Kaufmann Publisher Inc., pp. 439–447.

* cited by examiner

Primary Examiner—Hiep T. Nguyen
(74) Attorney, Agent, or Firm—Katten Muchin Zavis Rosenman

(57) ABSTRACT

A memory includes a memory array and address conversion table. The memory array has a plurality of page memories addressed in accordance with a logical address on an address bus. The address conversion table converts the logical address assigned to the page memory into a physical address and outputs it to the page memory.

8 Claims, 6 Drawing Sheets

MEMORY WITH ADDRESS CONVERSION TABLE

BACKGROUND OF THE INVENTION

The present invention relates to a memory integrated circuit that forms the main memory of a computer system and, more particularly, to a memory with an address conversion table which allows high-speed access to a main memory in a virtual memory.

Generally, a computer system validates a plurality of processes simultaneously and executes them while time-divisionally distributing the hardware to the processes, thereby efficiently using the hardware resources. A virtual memory is often used to provide the same program environment to the processes. When the virtual memory is used, all processes can have an address space in the same range and independently address the memory. That is, the processes actually access different memories.

To realize such a virtual memory, address values must be converted between the memory address (virtual address) on the program and the real address (physical address) of the memory to be actually addressed.

In this case, when a table for address conversion is prepared on an external memory, a long time is required to look up the conversion table. This is because when the external memory is to be addressed, the address is converted into a physical address by looking up the external conversion table, and after this, the target external memory is addressed. To shorten the memory access time, the address conversion table is prepared in the microprocessor.

A conventional address conversion table is shown in, e.g., John L. Nennessy & David A. Patterson, "Computer Architecture a Quantitative Approach", Second Edition 1996, Morgan Kaufmann Publisher Inc., pp. 439–447. This address conversion table will be described with reference to FIGS. 11 and 12.

FIG. 11 shows the arrangement of a conventional memory.

In a memory 5 which is conventionally used as a main memory, part of address data (to be referred to as an address hereinafter) input from an address bus 100 is supplied to a memory array 10 to read out data to a CAS (Column Address Select) buffer 30. Subsequently, the remaining part of the address is supplied to the CAS buffer 30.

In a data read, data designated by an address is extracted from the CAS buffer 30 to a data bus 101. In a data write, a value supplied to the data bus 101 is written in a corresponding portion of the CAS buffer 30, and the value of the CAS buffer 30 is written back to the memory array 10. As described above, the conventional memory 5 has no function of converting the value of the address bus 100.

FIG. 12 shows the schematic arrangement of the main memory portion of a computer in use of the memory 5 shown in FIG. 11.

Referring to FIG. 12, a microprocessor 2' has the 64-bit data bus 101 as a memory bus. A plurality of memories 5 have 16-bit data buses 101a, 101b, 101c, and 101d, respectively. The 64-bit data bus 101 on the microprocessor 2' side is divided into the 16-bit data buses 101a, 101b, 10c, and 101d and connected to the memories 5.

The address bus 100 is commonly connected to the memories. In the microprocessor 2', an address is output from a core 60 as a virtual address (logical address) value. The logical address output from the core 60 is divided into a logical page address 120 and page offset address 121. The logical page address 120 is converted into a physical page address 122 by an address conversion table 61. The physical page address 122 and page offset address 121 are combined to generate a physical address which is output to the address bus 100. In this way, the physical address is supplied to the memories 5, and memory cells in the memories 5 are addressed.

The address conversion table 61 in the microprocessor has only several to several ten entries because of the limitations on the number of elements and chip area of the integrated circuit constructing the microprocessor. On the other hand, a main memory 200 formed from the plurality of memories 5 has a capacity of several ten Mbytes to several Gbytes and is divided into pages each having 64 to 512 kbytes. For this reason, the main memory 200 requires a page table having several hundred to several ten thousand entries.

The address conversion table 61 in the microprocessor 2' can address only part of the main memory 200. A logical address that is not present in the address conversion table 61 must be converted into a physical address by looking up the page table prepared in the main memory 200. Hence, a long time is required to address the main memory 200.

Even if the microprocessor 2' can have a large address conversion table, the main memory 200 may be expanded, resulting in a shortage of entries of the address conversion table in the microprocessor.

SUMMARY OF THE INVENTION

It is an object of the present invention to provide a memory with an address conversion table capable of shortening the main memory access time.

In order to achieve the above object, according to the present invention, there is provided a memory comprising a memory array having a plurality of page memories addressed in accordance with a logical address on an address bus, and an address conversion table for converting the logical address assigned to the page memory into a physical address and outputting a physical page address to the page memory.

DESCRIPTION OF THE PREFERRED EMBODIMENTS

The present invention will be described below with reference to the accompanying drawings.

Figure 1:
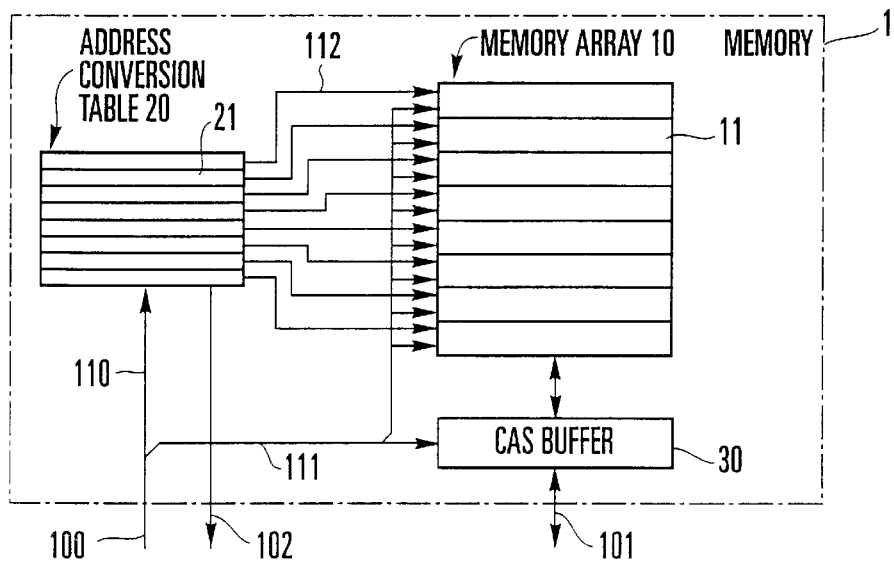
FIG. 1 is a view showing the arrangement of a memory according to the first embodiment of the present invention.

FIG. 1 shows the schematic arrangement of a memory according to the first embodiment of the present invention. Referring to FIG. 1, a memory 1 has a memory array 10, address conversion table 20, and CAS buffer 30. The memory array 10 is divided into a plurality of page memories (memory cells of one page; to be referred to as a page hereinafter) 11 of several ten to several hundred kbytes. In the address conversion table 20, entries 21 are allocated in correspondence with the pages 11 in the memory array 10.

A logical address supplied to an address bus 100 is divided into a logical page address 110 and page offset address 111. For the logical page address 110, a page 11 in the memory array 10, which corresponds to the logical page address 110, is checked by looking up the address conversion table 20.

When the logical page address 110 corresponds to one of the pages, one of address conversion table hit signals 112 representing physical addresses (physical page addresses) changes to "1". This activates the corresponding page 11 in the memory cell array 10 to allow addressing data in the page 11. The page offset address 111 is supplied to the memory array 10 and CAS buffer 30 to determine data in the active page 11 in the memory array 10, which is to be addressed.

Figure 11:
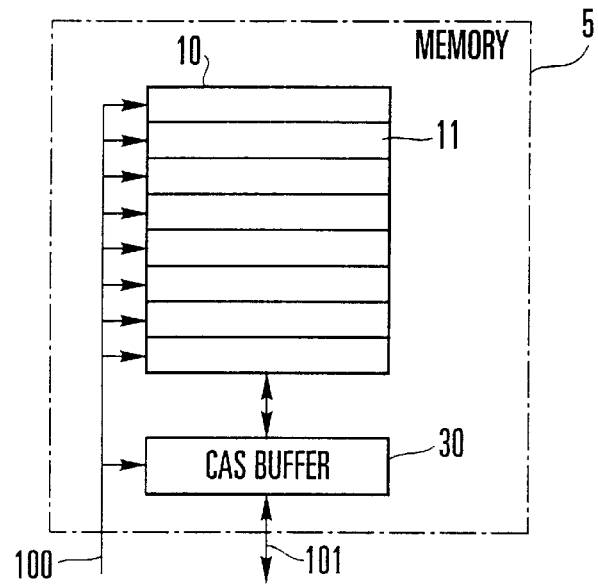
FIG. 11 is a view showing the arrangement of a conventional memory.
Figure 12:
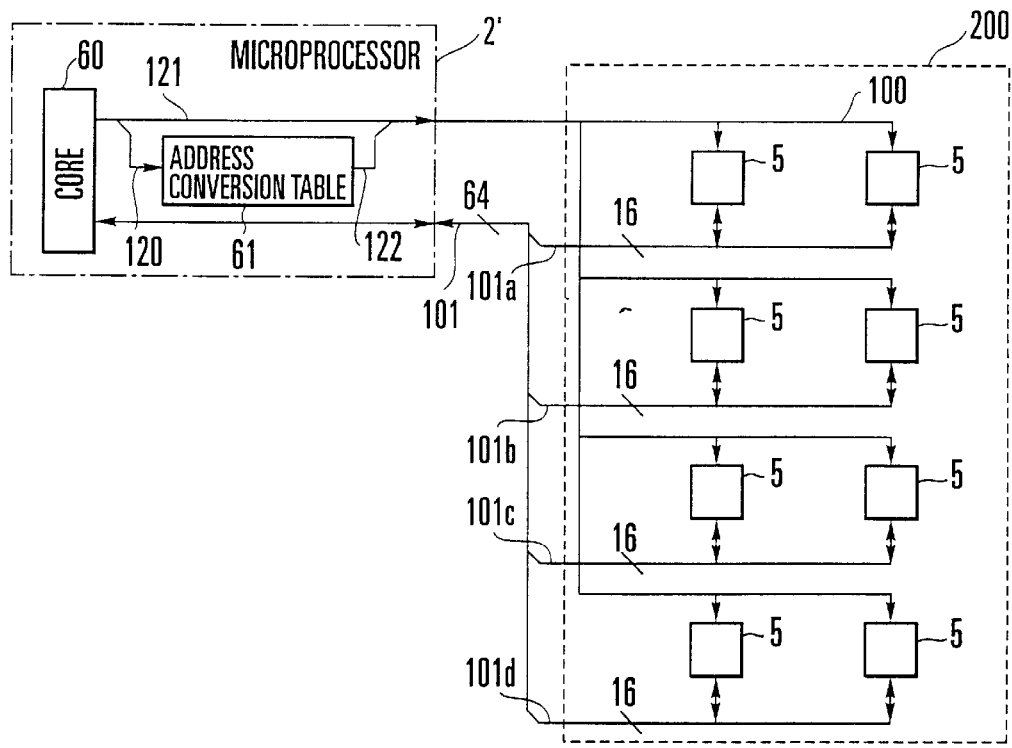
FIG. 12 is a view showing the schematic arrangement of a main memory when the memory shown in FIG. 11 is applied to a computer system.

The data access operation is the same as that in the conventional memory 5 shown in FIG. 11. More specifically, in a read, the value of the memory to be accessed is read out to the CAS buffer 30 and then output to a data bus 101. In a write, the value is written in the corresponding portion of the CAS buffer 30, and then, the contents of the CAS buffer 30 are written back to the memory array 10.

When a page 11 corresponding to the logical page address 110 is present in the memory array 10, a hit signal 102 is output from the address conversion table 20, as described above. If no corresponding page is present, the contents of the address conversion table 20 (i.e., the page conversion table) and data contents of the pages 11 in the memory array 10 are changed, and then, data are accessed again.

To clarify the arrangement and indicate the arrangement common to all the following embodiments, a mechanism for changing the address conversion table 20 is not illustrated in FIG. 1.

Figure 2:
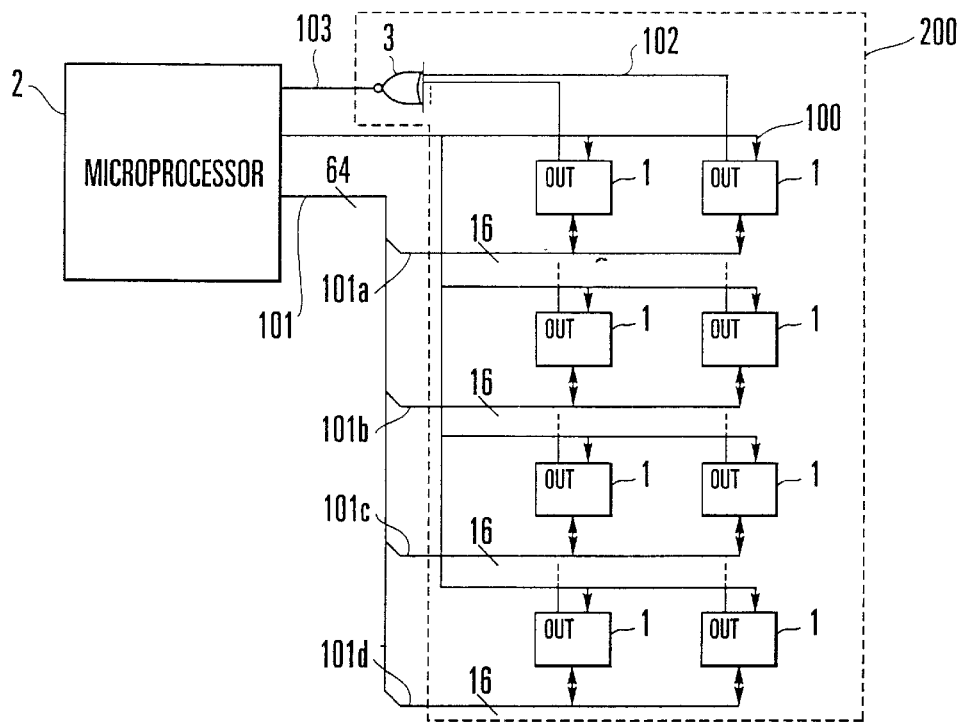
FIG. 2 is a view showing the schematic arrangement of a main memory when the memory shown in FIG. 1 is applied to a computer system.

FIG. 2 shows the schematic arrangement of a main memory portion using the memory 1 shown in FIG. 1. Referring to FIG. 2, the 64-bit data bus 101 is connected to a microprocessor 2, and 16-bit data buses 101a, 101b, 101c, and 101d are connected to a plurality of memories 1, respectively.

The data bus of the microprocessor 2 may be a 32- or 128-bit bus, though generality is not lost. The data bus on the memory 1 side can be any one of 1- to 32-bit buses, though the mention to only the 16-bit data bus does not negate generality.

In the example shown in FIG. 2, the 64-bit data bus 101 is divided into the 16-bit data buses 101a, 101b, 101c, and 101d and connected to the memories 1. The address bus 100 to which a logical address is output is commonly connected to the memories 1. Each memory 1 receives this logical address and converts it into a physical address by looking up the address conversion table 20 in the memory 1 such that a corresponding page in the memory array 10 can be addressed.

When the address conversion table 20 has the target address, the hit signal 102 is output from the memory 1. Each memory 1 has a hit signal terminal OUT. The outputs from the hit signal terminals OUT are input to a NOR circuit 3. When one hit signal 102 is output from the memories 1, the output from the NOR circuit 3 is at "0". On the other hand, when no hit signal 102 is output from the memories 1, the output from the NOR circuit 3 is at "1".

The output from the NOR circuit 3 is supplied to the microprocessor 2 as an interrupt signal 103. When no hit signal 102 is output from the memories 1, the microprocessor 2 is notified that the corresponding page 11 to be accessed is not present in a main memory 200. In this case, the microprocessor 2 executes, e.g., an interrupt routine to exchange the pages 11.

Figure 3:
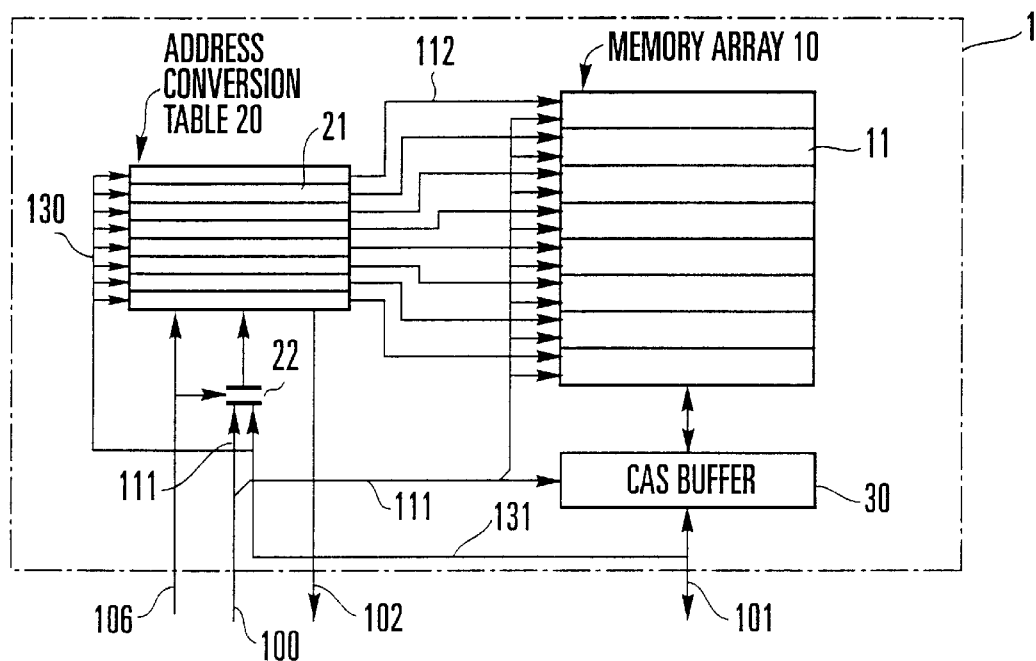
FIG. 3 is a view showing a memory obtained by adding an arrangement for rewriting the address conversion table to the memory shown in FIG. 1.

FIG. 3 shows the memory 1 shown in FIG. 1, which has an arrangement necessary for page exchange. For other embodiments to be described later as well, the pages 11 can be exchanged by adding the same mechanism as in FIG. 3.

Referring to FIG. 3, addresses different from those of the memory array 10 are allocated in the address conversion table 20. A memory space or IO space may be allocated to the different addresses. To rewrite the contents of the address conversion table 20, an address conversion table look-up address 130 as another address is supplied from the address bus 100 to the address conversion table 20. Similarly, an address conversion table data bus 131 is given from the data bus 101.

In this arrangement, only when the address conversion table 20 is to be rewritten, a selector 22 switches between the address bus 100 and address conversion table data bus 131. This mechanism allows the microprocessor 2 side to look up the address conversion table 20 as in addressing the memory array 10 of the memory 1.

In the page rewrite routine of the microprocessor 2, the page 11 of the memory array 10, which is to be replaced, is designated using the address conversion table 20. The data of the page 11 is written back to a secondary storage device such as a hard disk (not shown) through the CAS buffer 30. Next, an address conversion table write enable signal 106 is output to the address conversion table 20. An entry 21 to be rewritten in the address conversion table 20 is designated by the address conversion table look-up address 130, and a logical address is written in the entry 21 to be rewritten, via the address conversion table data bus 131. With this operation, the address conversion table 20 is rewritten.

When the address conversion table 20 can be looked up in the memory space or IO space, the same processing as in writing a value in the memory or IO can be performed. For this reason, a write enable signal for the memory or IO can be directly used as the address conversion table write enable signal 106.

Finally, the microprocessor 2 addresses the page 11 in the memory array 10 using the logical address of the rewritten address conversion table 20, and writes the data saved in the secondary storage device via the CAS buffer 30.

As will be described later, the address conversion table 20 has a register for registering a logical address in each entry 21 and a comparator for comparing the contents of addresses. The register and comparator may be formed from independent circuit elements. Alternatively, an arrangement such as the tag of a content-addressable memory may be used.

Figure 4:
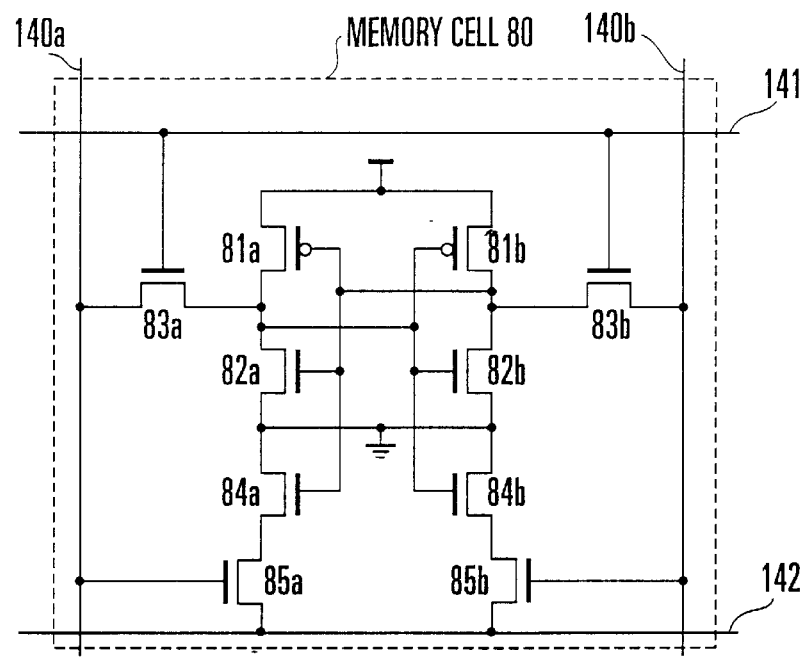
FIG. 4 is a circuit diagram of a memory cell of the address conversion table shown in FIG. 1.

FIG. 4 shows the arrangement of a memory cell 80 of the address conversion table 20. Referring to FIG. 4, in the memory cell 80, PMOS transistors 81a and 81b and NMOS transistors 82a and 82b construct two inverters to hold data. NMOS transistors 83a and 83b write data. NMOS transistors 84a, 84b, 85a, and 85b construct an XOR circuit (exclusive OR circuit) to compare contents stored in the memory cell 80 with the contents of a bit line. The PMOS transistors 81a and 81b and NMOS transistors 82a and 82b construct the above-described register. The NMOS transistors 84a, 84b, 85a, and 85b construct the above-described comparator.

In a data write, a value to be written is supplied to a bit line 140a, and the inverted value is supplied to a bit line 140b. When a word line 141 is set at a high potential, the data is written through the NMOS transistors 83a and 83b. When data are to be compared, a match line 142 is precharged to a high potential. A value to be compared is supplied to the bit line 140a, and its inverted value is supplied to the bit line 140b. When data comparison shows that the values coincide, the match line 142 is not discharged. If the data do not coincide, the match line 142 is discharged.

When multiple bit data are to be compared, the same match line 142 is connected to memory cells for storing the plurality of bit data to be compared. The match line 142 is not discharged only when all data coincide. When even one bit data does not coincide, the match line 142 is discharged from the bit data. With this processing, multiple bit data can be compared.

Figure 5:
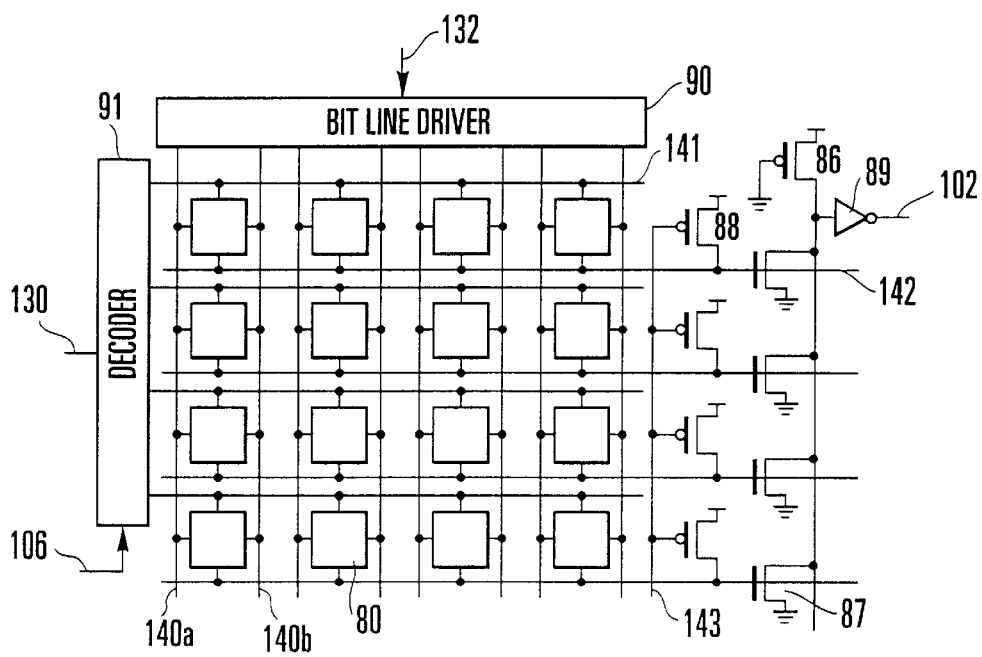
FIG. 5 is a view showing the detailed arrangement of the address conversion table shown in FIG. 1.

FIG. 5 shows the address conversion table 20 using the memory cell 80 shown in FIG. 4. The memory cells 80 forming one entry 21 share the same word line 141 and match line 142. A precharge PMOS transistor 88 is connected to the match line 142. To generate the hit signal 102, an OR circuit is constructed by a PMOS transistor 86, NMOS transistor 87, and inverter 89.

To write data in the memory cell 80, write data is supplied to a write comparison data line 132, and the write data is supplied to the bit line of the memory cell 80 via a bit line driver 90. When the address of the entry 21 where the data is to be written is supplied to the address conversion table look-up address 130, and the address conversion table write enable signal 106 is supplied, a decoder 91 sets the word line 141 of the entry 21 where the data is to be written at a high potential. With this processing, the data is written in the entry 21 in the address conversion table 20.

To compare data of the memory cell 80, the match line 142 is precharged in accordance with a precharge signal 143. The value to be compared is supplied to the write comparison data line 132, and the comparison data is supplied to the bit line of the memory cell 80 via the bit line driver 90. The data of the memory cell 80 is compared. If one data coincides, only the match line 142 of the corresponding entry 21 is set at the high potential, and the remaining match lines 142 are at the low potential. The values of all the match lines 142 are ORed and output as the hit signal 102. The signal of the match line 142 can be output as the address conversion table hit signal 112 shown in FIG. 1 directly or after adjustment of the timing.

Figure 6:
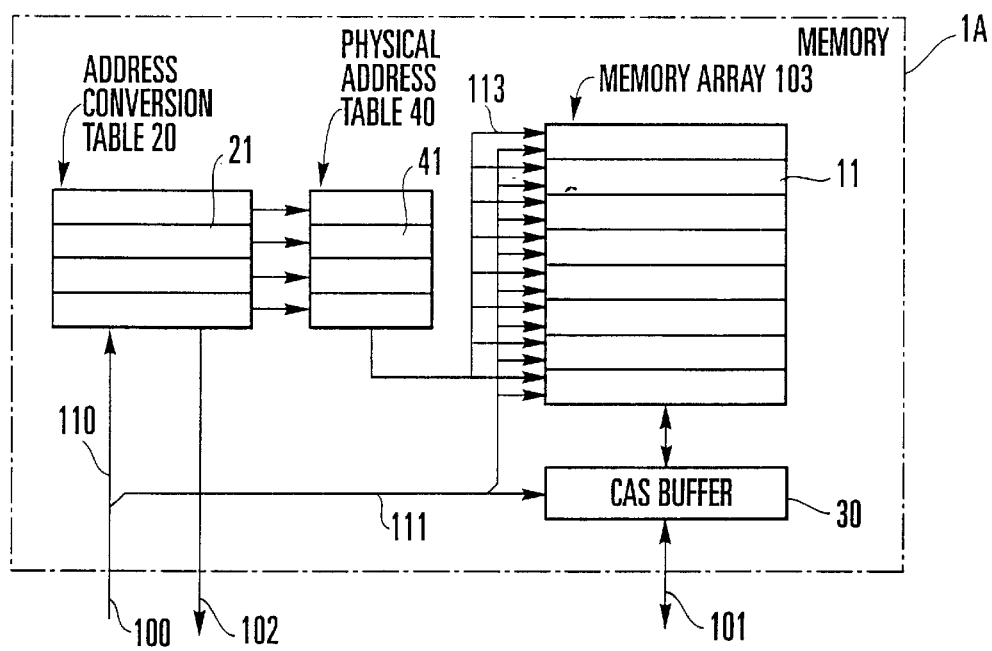
FIG. 6 is a view showing the arrangement of a memory according to the second embodiment of the present invention.

FIG. 6 shows the schematic arrangement of a memory according to the second embodiment of the present invention.

In the embodiment shown in FIG. 1, the entries 21 corresponding to all pages 11 can be integrated in the memory 1. However, all entries 21 may not be integrated because of the chip area or the like. FIG. 6 shows an example for this case.

In a memory 1A shown in FIG. 6, a physical page address 113 is extracted from a physical address table 40 first by looking up an address conversion table 20. Entries 21 of the address conversion table 20 correspond to entries 41 of the physical address table 40 in a one-to-one correspondence. If a value in coincidence with the given logical page address is stored in a certain entry 21 of the address conversion table 20, the physical page address 113 stored in the entry 41 corresponding to that entry 21 is extracted from the physical address table 40.

This physical page address 113 has a value corresponding to the upper portion (portion excluding the page offset address) of the normal address used to address a memory. This value is input to a memory array 10 to address a corresponding page 11.

When the address value of the corresponding page 11 is registered in the address conversion table 20, a hit signal 102 is output from the address conversion table 20. When the address value of the corresponding page 11 is not registered in the address conversion table 20, the page 11 may be present in the memory array 10 or not present in the memory array 10. These cases can be discriminated by looking up a page table (not shown) in a main memory 200.

When the corresponding page 11 is present in the memory array 10, the corresponding entries of the address conversion table 20 and physical address table 40 are rewritten such that the page 11 can be addressed. When the corresponding page 11 is not present in the memory array 10, the corresponding entries of the address conversion table 20 and physical address table 40 are rewritten. After the rewrite, the corresponding page 11 of the memory array 10 is designated using the rewritten entry of the address conversion table 20, and the contents of the page 11 are registered such that the page 11 can be addressed.

To replace the entries, an address space is allocated in the physical address table 40 as in address allocation in the address conversion table 20 shown in FIG. 3 such that the table can be looked up from a microprocessor 2 side by an interrupt routine. More specifically, to rewrite the entry 21 of the address conversion table 20, an address conversion table write enable signal 106 is output to the address conversion table 20, as in FIG. 3. The entry 21 of the address conversion table 20, which is to be rewritten, is designated using an address conversion table look-up address 130, and a logical address is written in the entry 21 to be rewritten via an address conversion table data bus 131.

To rewrite the entry 41 of the physical address table 40, a write enable signal (not shown) is output to the physical address table 40, as in the rewrite of the entry of the address conversion table 20. The entry 41 of the physical address table 40, which is to be rewritten, is designated using a physical address table look-up address (not shown), and a physical page address is written in the entry 41 to be rewritten via a physical address table data bus (not shown).

A memory such as a Rambus DRAM (Dynamic Random Access Memory) has a bus commonly used as a data bus and address bus. The type of address or access is written in a command packet. In this case, the memory to be accessed is determined by looking up the address in the command packet.

Figure 7:
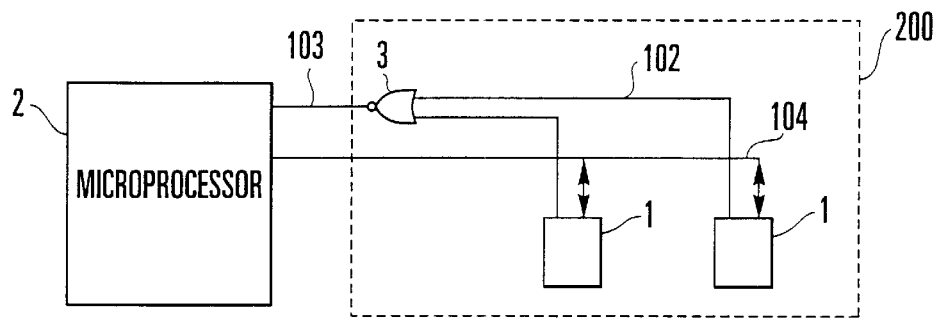
FIG. 7 is a view showing the schematic arrangement of a main memory when a Rambus DRAM is applied to a computer system.

FIG. 7 shows the arrangement of the main memory 200 when the present invention is applied to such a Rambus DRAM.

Referring to FIG. 7, the microprocessor 2 and memory (Rambus DRAM) 1 are connected via an address data common bus 104. A command packet and data packet are exchanged via the common bus 104. In this case as well, the hit signals 102 are collected by a NOR circuit 3 and output as an interrupt signal 103 to the microprocessor 2.

Figure 8:
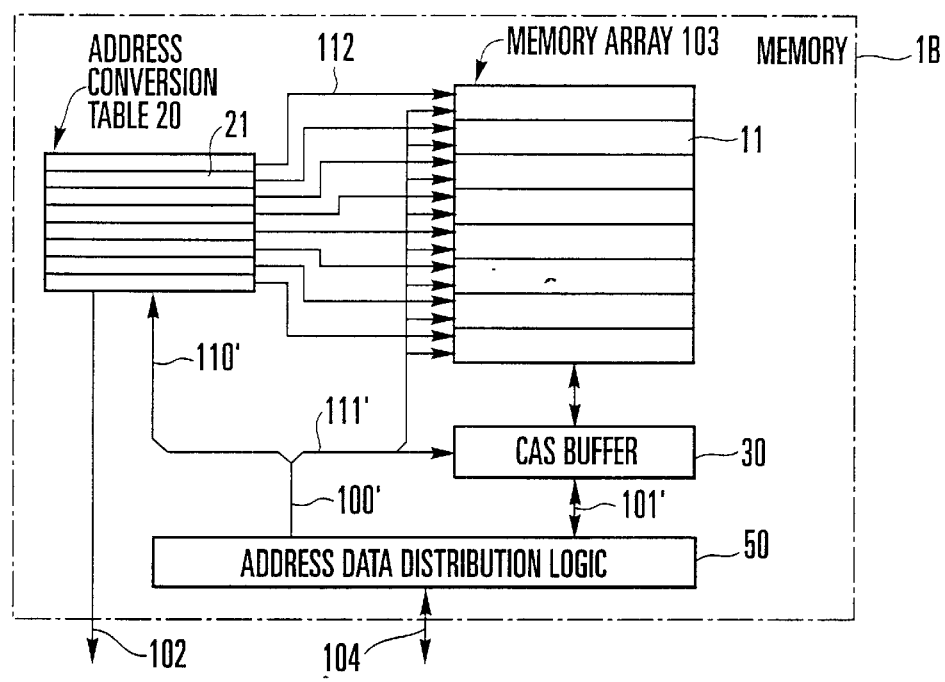
FIG. 8 is a view showing the arrangement of a memory according to the third embodiment of the present invention.

FIG. 8 shows the third embodiment of the present invention in which the present invention is applied to a Rambus DRAM.

In a memory 1B shown in FIG. 8, a command packet on a common bus 104 is distributed onto an address bus 100', and a data packet on the common bus 104 is distributed onto a data bus 101' by an address data distribution logic 50. The value of the address bus 100' is divided into a logical page address 110' and page offset address 111'. The logical page address 110' is supplied to an address conversion table 20 to activate a corresponding page 11 in a memory array 10.

The data in the memory array 10 designated by part of the page offset address 111' is read out to a CAS buffer 30. The data in the CAS buffer 30, which is to be accessed, is designated by the remaining part of the page offset address 111'.

The data read and write are the same as in the conventional memory described above. In the arrangement shown in FIG. 8 as well, a hit signal 102 is output when the target address is present in the address conversion table 20.

As shown in FIG. 2, when one data bus 101 is divisionally connected to a plurality of memories 1, one page 11 is divisionally placed on the plurality of memories 1. More specifically, when one page has 8 kbytes, and a data bus is divided into four buses, as shown in FIG. 2, the page is divisionally placed on four memories in units of 2 kbytes. For this reason, the number of pages per memory increases to result in a shortage of entries.

Figure 9:
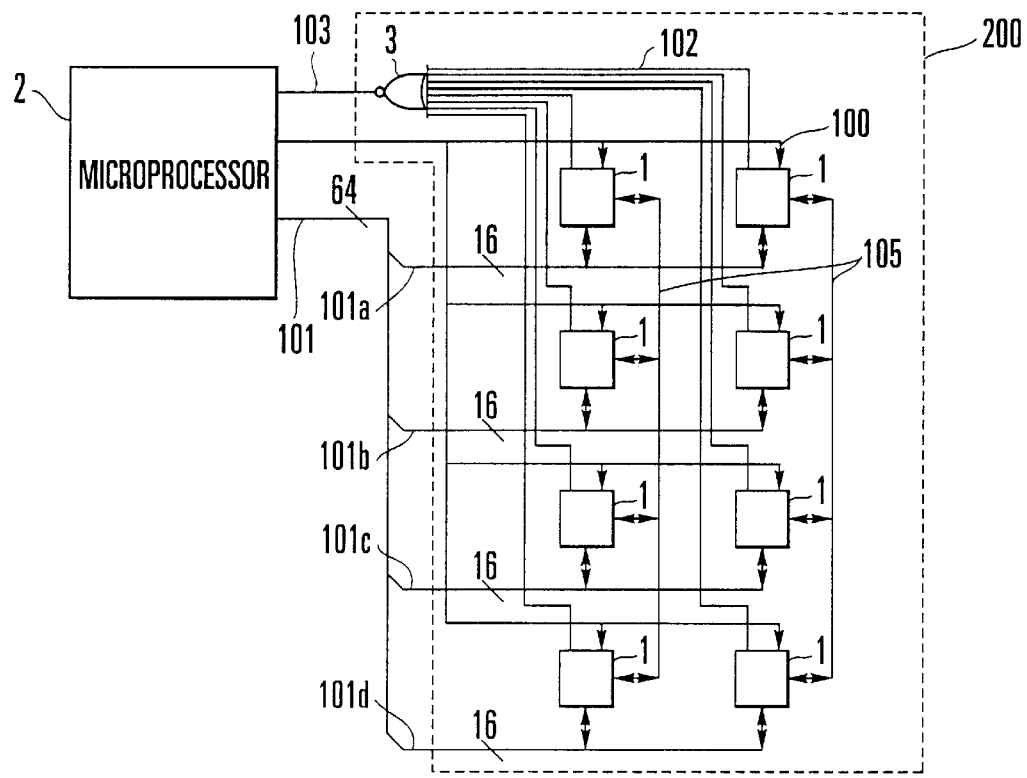
FIG. 9 is a view showing the schematic arrangement of a main memory when a memory with distributed page entries is applied to a computer system.

To solve this, page entries are distributed to memories having the same page such that the memories have different page entries, as shown in FIG. 9. The physical address converted by the address conversion table 20 is transmitted to the three remaining memories via a back bus 105. Since the address conversion table 20 is distributed to four memories, hit signals 102 need be extracted from all the memories and input to a NOR circuit 3. When not four but two page entries suffice, the two distributed page entries are connected via the back bus 105, and two hit signals are input to the NOR circuit.

Figure 10:
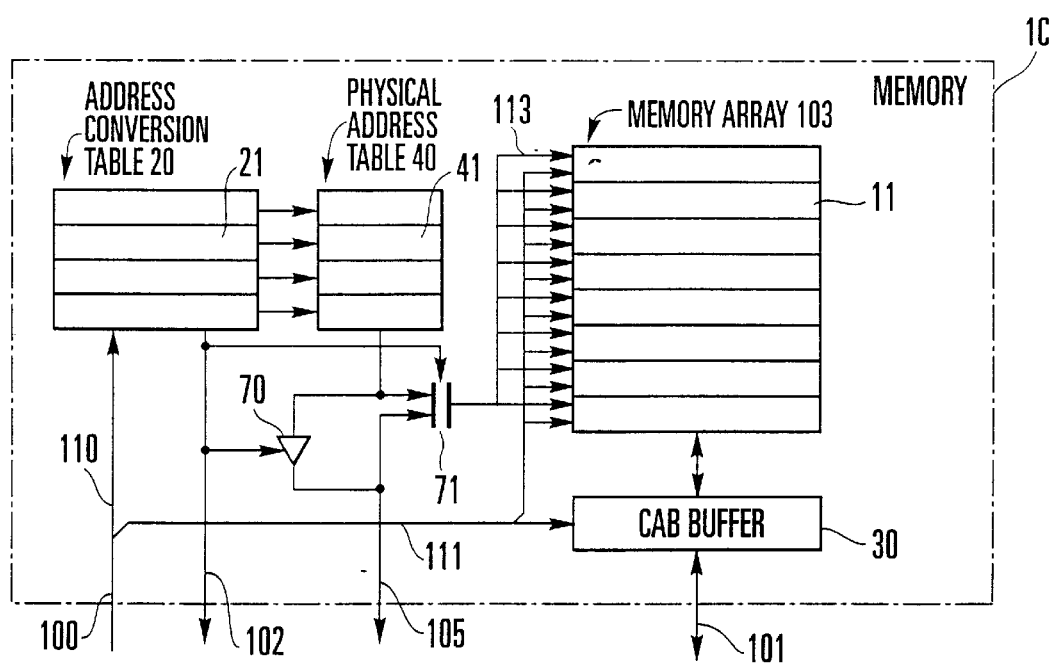
FIG. 10 is a view showing the arrangement of a memory according to the fourth embodiment of the present invention.

FIG. 10 shows the fourth embodiment of the present invention in which entries are distributed via a back bus 105. A memory array 10, address conversion table 20, CAS buffer 30, and physical address table 40 are the same as in the embodiment shown in FIG. 2.

Referring to FIG. 10, when the address conversion table 20 is hit, the memory array 10 is addressed using a value (physical page address) extracted from a corresponding entry 41 in the physical address table 40. In addition, the extracted physical page address is output to the back bus 105 via a three-state buffer 70. The three-state buffer 70 is controlled using a hit signal 102 from the address conversion table 20.

When the address conversion table 20 is not hit, a physical page address supplied from the address conversion table in another memory via the back bus 105 is used to address the memory array 10. This switching is performed by controlling a selector 71 in accordance with the hit signal 102. As a result, the same entry 41 can be shared by a plurality of memories by changing the lower address (i.e., the page offset address) between the memories.

As has been described above, according to the present invention, the number of entries of the address conversion table can be increased. The reason for this is as follows. Conventionally, an address conversion table is prepared in one microprocessor, and the number of entries is limited by the chip area. According to the present invention, however, a computer system has a plurality of memories. For this reason, even when each memory has only a small address conversion table, the total number of entries can be increased.

When the capacity of the main memory is increased, the number of entries of the address conversion table can be increased. This is because since each memory has an address conversion table, the number of entries of the address conversion table increases accordingly when memories are added.

As a consequence, the average time of access to the main memory can be shortened. When the capacity of the main memory is increased, the number of entries of the address conversion table also increases. In this case as well, the average time of access to the main memory can be shortened.

What is claimed is:

1. A plurality of memory devices in a single memory system, each of said memory devices comprising:

a memory array having a plurality of page memories addressed in accordance with a logical address on an address bus; and an address conversion table for converting a logical address assigned to a page memory into a physical address and outputting a physical page address to said page memory.

2. A plurality of memory devices in a single memory system according to claim 1, wherein the address conversion table has a plurality of entries storing logical addresses.

3. A plurality of memory devices in a single memory system according to claim 2, further comprising an output terminal for outputting a coincidence signal when the logical address on the address bus, which is used to address said memory array, coincides with a logical address stored in an entry of the address conversion table.

4. A plurality of memory devices in a single memory system according to claim 2, wherein the number of entries of the address conversion table is equal to the number of page memories.

5. A plurality of memory devices in a single memory system according to claim 2, wherein the number of entries of the address conversion able is smaller than the number of page memories, when the logical address stored in an entry of the address conversion table coincides with the logical address on the address bus, which is used to address said memory array, the logical address stored in the entry of the address conversion table is converted and output to said page memory as a physical page address, and when the logical address stored in the entry of the address conversion tables does not coincide with the logical address on the address bus, which is used to address said memory array, another logical address is stored in the entry of the address conversion table to replace pages.

6. A plurality of memory devices in a single memory system according to claim 2, wherein a register for holding a logical address, and a comparator for comparing the logical address held in said register with the logical address on the address bus, which is used to address said memory array.

7. A plurality of memory devices in a single memory system according to claim 6, further comprising address conversion means for, when the comparison result from said comparator indicates that the logical addresses coincide, converting the logical address into a physical page address and outputting the physical page address to said page memory.

8. A plurality of memory devices in a single memory system according to claim 7, wherein said address conversion means is constructed by a physical address table having a plurality of entries respectively corresponding to the entries of the address conversion table, and each entry of the physical address table stores a physical page address corresponding to a logical address.

* * * * *